(12) United States Patent
Zhu

(10) Patent No.: US 10,133,906 B2
(45) Date of Patent: Nov. 20, 2018

(54) AUDIO DEVICE AND DISPLAY DEVICE

(71) Applicant: BOE TECHNOLOGY GROUP CO., LTD., Beijing (CN)

(72) Inventor: Lin Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 190 days.

(21) Appl. No.: 15/105,863

(22) PCT Filed: Jan. 7, 2016

(86) PCT No.: PCT/CN2016/070327
§ 371 (c)(1),
(2) Date: Jun. 17, 2016

(87) PCT Pub. No.: WO2017/012298
PCT Pub. Date: Jan. 26, 2017

(65) Prior Publication Data
US 2017/0193263 A1 Jul. 6, 2017

(30) Foreign Application Priority Data

Jul. 23, 2015 (CN) .......................... 2015 1 0438561

(51) Int. Cl.
G06K 9/00 (2006.01)
G01S 15/89 (2006.01)
G06F 3/043 (2006.01)

(52) U.S. Cl.
CPC ........ G06K 9/0002 (2013.01); G01S 15/8906 (2013.01); G06F 3/0433 (2013.01); G06K 9/00067 (2013.01); G06K 9/00087 (2013.01)

(58) Field of Classification Search
CPC ............. G06K 9/0002; G06K 9/00067; G06K 9/00087; G06F 3/0433
See application file for complete search history.

(56) References Cited

U.S. PATENT DOCUMENTS

2014/0352440 A1* 12/2014 Fennell .................. G01N 29/22
73/632
2014/0355387 A1    12/2014 Kitchens, II et al.
2017/0086072 A1     3/2017 Mao et al.

FOREIGN PATENT DOCUMENTS

CN  102693050 A  9/2012
CN  103945026 A  7/2014
(Continued)

OTHER PUBLICATIONS

Form PCT/ISA/210 issued in International application No. PCT/CN2016/070327 dated Apr. 14, 2016.
(Continued)

*Primary Examiner* — Phuoc Tran
(74) *Attorney, Agent, or Firm* — Nath, Goldberg & Meyer; Joshua B. Goldberg

(57) ABSTRACT

The present invention provides an audio device and a display device. The audio device comprises a vibrating diaphragm, an ultrasonic emitting element and a processing unit. The vibrating diaphragm is used for converting an acoustical signal into an electrical signal or converting an electrical signal into an acoustical signal, receiving a reflected wave signal of an ultrasonic signal generated by the ultrasonic emitting element after reflected from the a surface of an object to be detected, converting the reflected wave signal into an electrical signal, and sending the electrical signals to the processing unit. The processing unit is used for processing the converted electrical signals to obtain surface feature information of the object to be detected.

20 Claims, 2 Drawing Sheets

(56) References Cited

FOREIGN PATENT DOCUMENTS

| CN | 104050402 A | 9/2014 |
|---|---|---|
| CN | 204069106 U | 12/2014 |
| CN | 105101002 A | 11/2015 |
| CN | 205693860 U | 11/2016 |

OTHER PUBLICATIONS

Form PCT/ISA/220 issued in International application No. PCT/CN2016/070327 dated Apr. 14, 2016.
Form PCT/ISA/237 issued in International application No. PCT/CN2016/070327 dated Apr. 14, 2016.
Office Action dated Sep. 30, 2017 issued in corresponding Chinese Application No. 201510438561.4.

\* cited by examiner

AUDIO DEVICE AND DISPLAY DEVICE

This is a National Phase Application filed under 35 U.S.C. 371 as a national stage of PCT/CN2016/070327, filed Jan. 7, 2016, an application claiming the benefit of Chinese Application No. 201510438561.4, filed Jul. 23, 2015, the content of each of which is hereby incorporated by reference in its entirety.

FIELD OF THE INVENTION

The present invention relates to the field of display technology, in particular to an audio device and a display device comprising the audio device.

BACKGROUND OF THE INVENTION

At present, fingerprint authentication technology begins to be applied to display products, such as a mobile phone and an ipad.

The working principle for applying fingerprint authentication technology to a mobile phone is as follows: a fingerprint are collected by a fingerprint collection unit, then a fingerprint image is generated from the collected fingerprint, the fingerprint image is processed to extract fingerprint feature points, and finally, the fingerprint feature points are compared with fingerprint authentication information stored in the mobile phone; when the comparison result shows that the extracted fingerprint feature points is in conformity with the stored fingerprint authentication information, the mobile phone, for example, is unlocked for operation.

But at present, in general, the fingerprint authentication device is independently manufactured and installed at a specific position in the mobile phone, such as on a certain function button on the display screen of the mobile phone or at a specific position on the back cover of the mobile phone. In this case, the space of the mobile phone is occupied, and independently manufacturing the fingerprint authentication device causes a waste of resources. That is, it is detrimental to both size miniaturization and cost reduction of the mobile phone.

SUMMARY OF THE INVENTION

To solve the above technical problems in prior art, the present invention provides an audio device and a display device comprising the audio device. The audio device has both a common function of converting an acoustical signal into an electrical signal or converting an electrical signal into an acoustical signal, and a function of acquiring surface feature information of an object to be detected. Because a vibrating diaphragm in the audio device also serves as the component for acquiring the surface feature information of the object to be detected, the cost for the audio device to acquire the surface feature information of the object to be detected is reduced, and the space occupation in the audio device is also reduced, which results in an insufficient increase in the size of the audio device.

The present invention provides an audio device, comprising a vibrating diaphragm used for converting an acoustical signal into an electrical signal or converting an electrical signal into an acoustical signal. The audio device further comprises an ultrasonic emitting element and a processing unit, the ultrasonic emitting element is used for emitting an ultrasonic signal; the vibrating diaphragm is also used for receiving a reflected wave signal of the ultrasonic signal reflected from a surface of an object to be detected, converting the reflected wave signal into an electrical signal, and sending the electrical signal to the processing unit; the processing unit is used for processing the converted electrical signal to obtain surface feature information of the object to be detected, the surface feature information being used for identifying the object to be detected.

According to an embodiment, the vibrating diaphragm is arranged between the ultrasonic emitting element and the object to be detected, and a position of the vibrating diaphragm corresponds to that of the ultrasonic emitting element.

According to an embodiment, the vibrating diaphragm comprises a base and a receiving element arranged on the base, the receiving element is used for receiving the reflected wave signal reflected from the surface of the object to be detected, converting the reflected wave signal into an electrical signal, and sending the converted electrical signal to the processing unit.

According to an embodiment, the receiving element comprises a first film layer and a second film layer sequentially stacked on the base, the second film layer is used for receiving the reflected wave signal reflected from the surface of the object to be detected and converting the reflected wave signal into an electrical signal, and the first film layer is used for sending the converted electrical signal to the processing unit.

According to an embodiment, the first film layer is formed of a metal conductive material, and the second film layer is formed of an organic piezoelectric material.

According to an embodiment, the audio device further comprises a magnetic element arranged under the vibrating diaphragm and opposite to the base, wherein, the base vibrates, under the effect of a magnetic field generated by the magnetic element, to convert an electrical signal into an acoustical signal, or vibrates, under the effect of an acoustical signal and cuts the magnetic field generated by the magnetic element to convert the acoustical signal into an electrical signal.

According to an embodiment, the base is a silicon slice.

According to an embodiment, the vibrating diaphragm comprises a plurality of receiving elements arranged at intervals.

According to an embodiment, the plurality of receiving elements are distributed uniformly.

According to an embodiment, the plurality of receiving elements are arranged in a matrix.

According to an embodiment, a distance between any two adjacent receiving elements is within a range of 50-100 μm; each of the receiving elements is in a rectangle shape with a side length within a range of 50-200 μm.

According to an embodiment, a resolution of the receiving elements is 500 dpi or more.

According to an embodiment, a distance between the vibrating diaphragm and the object to be detected is 10 cm or less.

According to an embodiment, the processing unit comprises an image generating module, an image processing module and a feature information extracting module; the image generating module is used for generating an image of the surface of the object to be detected according to the converted electrical signal and sending the image of the surface of the object to be detected to the image processing module; the image processing module is used for performing a detailed operation processing on the image of the surface of the object to be detected and sending the processed image of the surface of the object to be detected to the feature information extracting module; the feature information extracting module is used for extracting the surface feature information of the object to be detected from the processed image of the surface of the object to be detected.

According to an embodiment, the object to be detected comprises a finger, and the surface feature information of the finger comprises feature information of a fingerprint.

The present further provides a display device comprising the above audio device.

According to an embodiment, the display device further comprises a touch authentication unit, the touch authentication unit comprises a surface feature information database and a matching module, the surface feature information database is used for storing the surface feature information of a plurality of objects to be detected; the matching module is used for matching the surface feature information obtained by the processing unit with the surface feature information stored in the surface feature information database, and if the matching result shows that the obtained surface feature information is in conformity with the stored surface feature information, it is allowed to perform touch operation on the display device.

According to an embodiment, the display device further comprises a touch unit, the touch unit comprises a detection module, a judgment module and a touch module, the touch unit stores therein a corresponding table in which a plurality of movement actions of the object to be detected are correspondingly associated with a plurality of touch functions; the detection module is used for detecting the movement action of the object to be detected relative to the audio device when the matching result shows that the obtained surface feature information is in conformity with the stored surface feature information; the judgment module is used for judging which touch function the movement action of the object to be detected corresponds to according to the detection result from the detection module; the touch module is used for activating the touch function corresponding to the movement action according to judgment result from the judgment module.

According to an embodiment, the audio device is a microphone or a loudspeaker of the display device.

Beneficial Effects of the Present Invention

The audio device provided in the present invention is provided with an ultrasonic emitting element and a processing unit, and the vibrating diaphragm already existing in the audio device also serves as the component for receiving the reflected wave signal reflected after the ultrasonic wave reaches the surface of the object to be detected, and therefore, the audio device is capable of obtaining the surface feature information of the object to be detected so that the audio device not only has the common function of converting an acoustical signal into an electrical signal or converting an electrical signal into an acoustical signal, but also has the function of acquiring surface feature information of the object to be detected. Because the vibrating diaphragm already existing in the audio device also serves as the component for receiving reflected wave signal, the cost for the audio device to acquire the surface feature information of the object to be detected is reduced, and the space occupation in the audio device is also reduced, which results in insignificant increase in size of the audio device.

With the above audio device included therein, the display device provided in the present invention can not only collect and authenticate the surface feature information of the object to be detected, but also allow or reject touch operation on the display device by using the surface feature information of the object to be detected. Meanwhile, by adopting the above audio device, the space of the display device is saved and the cost of the display device is also reduced.

DETAILED DESCRIPTION OF THE EMBODIMENTS

Hereinafter, an audio device and a display device provided in the present invention will be described in detail with reference to the accompanying drawings and specific embodiments so that a person skilled in the art can better understand the technical solutions of the present invention.

Figure 1:
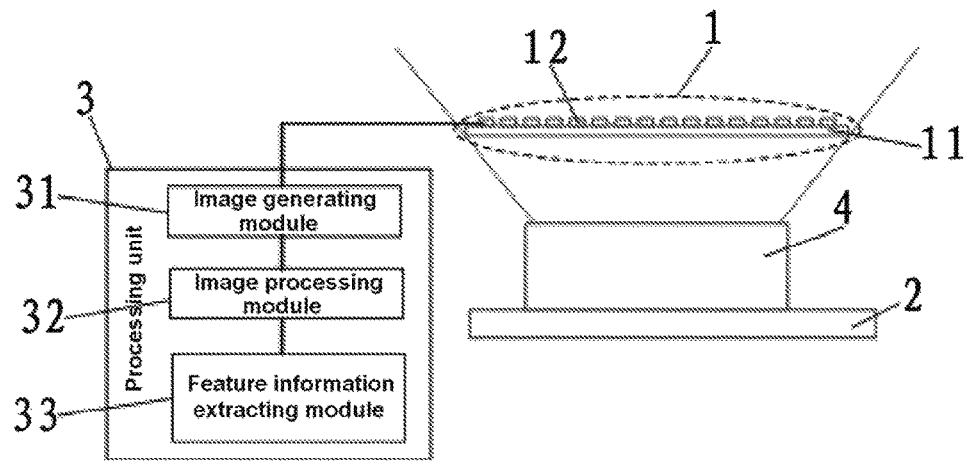
FIG. 1 is a structural diagram of an audio device according to an embodiment of the present invention.

An embodiment of the present invention provides an audio device, and as shown in FIG. 1, the audio device comprises a vibrating diaphragm 1. The vibrating diaphragm 1 can convert an acoustical signal into an electrical signal or convert an electrical signal into an acoustical signal. The audio device further comprises an ultrasonic emitting element 2 and a processing unit 3. The ultrasonic emitting element 2 is used for emitting an ultrasonic signal. The vibrating diaphragm 1 is also used for receiving a reflected wave signal of the ultrasonic signal reflected from a surface of an object to be detected, converting the reflected wave signal into an electrical signal, and sending the electrical signal to the processing unit 3. The processing unit 3 is used for processing the electrical signal to obtain surface feature information of the object to be detected, and the surface feature information is used for identifying the object to be detected.

In the embodiment, the object to be detected comprises a finger, and the surface feature information of the finger comprises feature information of a fingerprint. The audio device obtains the surface feature information of the object to be detected by using ultrasonic technology so as to identify the object to be detected. An ultrasonic wave is reflected after reaching the surface of the fingerprint. Because the strength of the reflected wave and the time for the reflected wave to return back when the ultrasonic wave reaches a fingerprint peak are different from those when the ultrasonic wave reaches a fingerprint valley, the surface feature information of the object to be detected can be obtained after the processing unit 3 processes the electrical signal converted from the reflected wave. The technique of using ultrasonic technology to detect the fingerprint feature information is widely known, and is thus not described in detail.

By providing the ultrasonic emitting element 2 and the processing unit 3, and using the vibrating diaphragm 1 already existing in the audio device as a component for receiving the reflected wave signal of the ultrasonic wave reflected from the surface of the object to be detected, the surface feature information of the object to be detected can be obtained, so that the audio device has both a function of converting an acoustical signal into an electrical signal or converting an electrical signal into an acoustical signal, and a function of acquiring surface feature information of the object to be detected. Meanwhile, because the component for receiving the reflected wave signal is a component already existing in the audio device, the cost for the audio device to acquire the surface feature information of the object to be detected is reduced, and the space occupation in the audio device is also reduced, which results in an insignificant increase in the size of the audio device.

In the embodiment, the vibrating diaphragm 1 is arranged between the ultrasonic emitting element 2 and the object to be detected, and the position of the vibrating diaphragm 1 corresponds to that of the ultrasonic emitting element 2. With such arrangement, the ultrasonic signal emitted by the ultrasonic emitting element 2 is reflected after reaching the surface of the object to be detected, and the reflected wave signal reflected from the surface of the object to be detected can be received by the vibrating diaphragm 1.

Figure 2:
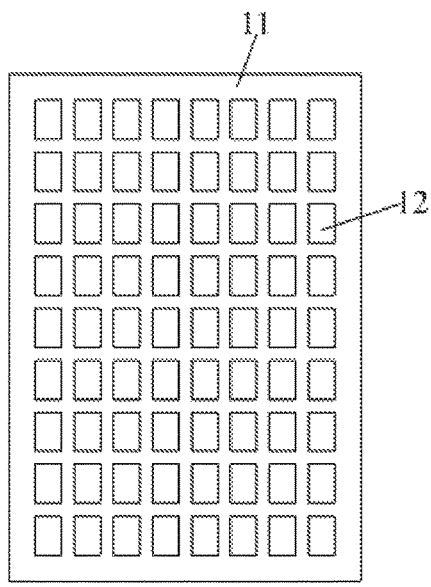
FIG. 2 is a top view of a structure of a vibrating diaphragm of the audio device shown in FIG. 1.
Figure 3:
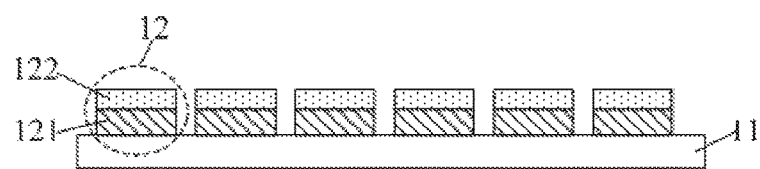
FIG. 3 is a sectional view of a structure of a vibrating diaphragm of the audio device shown in FIG. 1.

In the embodiment, as shown in FIGS. 2 and 3, the vibrating diaphragm 1 comprises a base 11 and a receiving element 12 arranged on the base 11. The receiving element 12 is used for receiving the reflected wave signal reflected from the surface of the object to be detected, converting the reflected wave signal into an electrical signal, and sending the converted electrical signal to the processing unit 3.

In the embodiment, the receiving element 12 comprises a first film layer 121 and a second film layer 122 sequentially stacked on the base 11. The second film layer 122 is used for receiving the reflected wave signal reflected from the surface of the object to be detected and converting the reflected wave signal into the electrical signal. The first film layer 121 is used for sending the electrical signal to the processing unit 3. The arrangement of the receiving element 12 realizes receiving and converting of the reflected wave signal so that the surface feature information of the object to be detected is collected.

In the embodiment, the first film layer 121 is formed of a metal conductive material such as copper or aluminum. The metal conductive material is capable of well transmitting an electrical signal. The second film layer 122 is formed of an organic piezoelectric material such as polyvinylidene fluoride (PVDF). The organic piezoelectric material is a material that is commonly used at present for receiving the reflected wave signal of the ultrasonic signal and converting the reflected wave signal of the ultrasonic signal into the electrical signal. The technique of using the organic piezoelectric material to receive and convert the reflected wave signal of the ultrasonic signal is widely known, and is thus not described in detail herein.

In the embodiment, the audio device further comprises a magnetic element 4 arranged under the vibrating diaphragm 1 and opposite to the base 11 of the vibrating diaphragm 1. The base 11 is capable of vibrating under the effect of a magnetic field generated by the magnetic element 4 to convert the electrical signal into the acoustical signal, or vibrating under the effect of the acoustical signal and cutting the magnetic field generated by the magnetic element 4 to convert the acoustical signal into the electrical signal. The base 11 may be a silicon slice.

When the base 11 vibrates to convert the electrical signal into the acoustical signal, the audio device is used for generating a sound (which can be generally heard by human's ears), and at this time, the audio device serves as a sound generating device, such as a loudspeaker. The specific working principle when the audio device serves as a sound generating device is as below. The magnetic element 4 is, for example, a coil wound around a permanent magnet. When there is an audio current passing through the coil in a magnetic field of the permanent magnet, an electromagnetic field, which changes with the audio current, is generated in the coil. The electromagnetic field and the permanent magnetic field of the permanent magnet interact with each other to cause the base 11 to vibrate and drive the ambient air to vibrate, thereby generating a sound. For example, an electrodynamic loudspeaker generates a sound based on the above principle.

When the base 11 vibrates to convert the acoustical signal into the electrical signal, the audio device is used for collecting an external sound into an electronic equipment (such as a computer, a mobile phone or the like), and at this time, the audio device serves as a sound recording device, such as a microphone. The specific working principle when the audio device serves as a sound recording device is as below. The external sound transmitted through air causes the base 11 to vibrate. The base 11, when vibrating, moves relatively to the coil and cuts magnetic force lines, which causes an induced current to be generated in the coil so that the acoustical signal is converted into the electrical signal. For example, based on the above principle, the microphone collects the external sound into an electronic equipment (such as a computer or a mobile phone). The specific sound generating process of the loudspeaker and the specific sound recording process of the microphone both belong to mature existing technologies, and are not described in detail herein.

In the embodiment, the vibrating diaphragm 1 may comprise a plurality of receiving elements 12. The plurality of the receiving elements 12 are arranged at intervals. Such arrangement makes it easy for the receiving elements 12 to receive the reflected wave signal reflected from the surface of the object to be detected. The plurality of the receiving elements 12 may be distributed uniformly. Such arrangement allows the reflected wave signals reflected from different positions of the surface of the object to be detected to be mostly received by the receiving elements 12, so that the audio device can collect the overall surface feature information of the object to be detected.

It should be explained that the plurality of the receiving elements 12 may be arranged at intervals, but not distributed uniformly. Under this situation, the reflected wave signal reflected from the surface of the object to be detected can also be received by the receiving elements 12, but the reflected wave signals reflected from different positions of the surface of the object to be detected are received in a less uniform manner, as compared with the case where the receiving elements 12 are distributed uniformly.

In the embodiment, the plurality of receiving elements 12 may be arranged in a matrix. A distance between any two adjacent receiving elements 12 is within a range of 50-100 μm. The receiving elements 12 each may be in a rectangle shape. A side length of the receiving element 12 is within a range of 50-200 μm. Such arrangement can ensure that the receiving elements 12 correctly acquire the surface feature information of the object to be detected (such as a fingerprint).

It needs to be explained that the receiving elements 12 may also be in a circle shape, a triangle shape, an equilateral polygon shape or the like, as long as it is ensured that the receiving elements 12 can correctly acquire the surface feature information of the object to be detected (such as a fingerprint).

In the embodiment, a resolution of the receiving elements 12 may be 500 dpi or more. Dpi (Dots Per Inch) refers to the number of the receiving elements 12 distributed per inch, and reflects the distribution density of the receiving elements 12. Such arrangement can ensure a sufficient collection precision of the surface feature information of the object to be detected, so that the surface feature information of the object to be detected obtained after processed by the processing unit 3 is more precise and clearer.

In the embodiment, a distance between the vibrating diaphragm 1 and the object to be detected is within a range of 0-10 cm. In this distance range, the vibrating diaphragm 1 can normally receive the reflected wave signal reflected from the surface of the object to be detected, so that the audio device can normally collect the surface feature information of the object to be detected. This distance range also makes it more flexible and more convenient for the audio device to acquire the surface feature information of the object to be detected, so that the audio device can identify the object to be detected more flexibly and more conveniently.

In the embodiment, the processing unit 3 comprises an image generating module 31, an image processing module 32 and a feature information extracting module 33. The image generating module 31 is used for generating an image of the surface of the object to be detected according to the electrical signal and sending the image of the surface of the object to be detected to the image processing module 32. The image processing module 32 is used for performing a detailed operation processing on the image of the surface of the object to be detected and sending the processed image of the surface of the object to be detected to the feature information extracting module 33. The feature information extracting module 33 is used for extracting surface feature information of the object to be detected from the processed image of the surface of the object to be detected. After the surface feature information of the object to be detected is extracted, the object to be detected is identified based on the extracted surface feature information.

In the embodiment, the conversion between the acoustical signal and the electrical signal and the reception and conversion of the reflected wave signal of the ultrasonic signal are performed independently by the audio device, that is, the sound generating operation or sound recording operation and the operation of identifying the object to be detected are performed independently by the audio device and do not disturb each other.

By arranging an ultrasonic emitting element and a processing unit, and using the vibrating diaphragm already existing in the audio device as the component for receiving the reflected wave signal reflected after the ultrasonic wave reaches the surface of the object to be detected, the audio device according to the embodiment of the present invention is capable of obtaining the surface feature information of the object to be detected. Therefore, the audio device has both a common function of converting the acoustical signal into the electrical signal or converting the electrical signal into the acoustical signal, and a function of acquiring surface feature information of the object to be detected. Meanwhile, because the vibrating diaphragm in the audio device also serves as the component for receiving the reflected wave signal, the cost for the audio device to acquire the surface feature information of the object to be detected is further reduced, and the space occupation in the audio device is also reduced, so that the size of the audio device will not be increased obviously.

Figure 4:
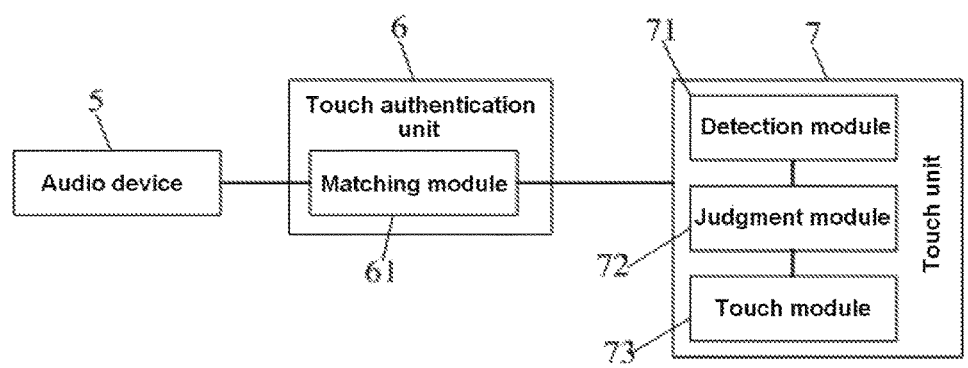
FIG. 4 is a schematic block diagram of a display device according to an embodiment of the present invention.

An embodiment of the present invention also provides a display device comprising an audio device 5 in the embodiment of the present invention, as shown in FIG. 4.

In the embodiment, the audio device 5 is a microphone or a loudspeaker arranged in the display device. With the audio device 5 according to the embodiment of the present invention included therein, the display device can not only collect and authenticate the surface feature information of the object to be detected, but also allow or reject touch operation on the display device by using the surface feature information of the object to be detected. Meanwhile, with the audio device 5 according to the embodiment of the present invention, the space of the display device is saved and the cost of the display device is also reduced.

In the embodiment, the display device further comprises a touch authentication unit 6, as shown in FIG. 4. The touch authentication unit 6 comprises a surface feature information database (not shown) and a matching module 61. The surface feature information database is used for storing the surface feature information of a plurality of objects to be detected. The matching module 61 is used for matching the surface feature information extracted by the feature information extracting module with the surface feature information stored in the surface feature information database. If the matching result shows that the extracted surface feature information is in conformity with the stored surface feature information, it is allowed to perform touch operation on the display device. For example, the display screen of the display device is unlocked to allow touch operation on the display screen. In an example, in the case where the object to be detected is a finger and the surface feature information of the object to be detected is the feature information of a fingerprint, when the matching result shows conformity, that is, when the surface feature information of the object to be detected passes the authentication of the touch authentication unit 6, it is allowed to perform touch operation on the display device.

In the embodiment, the display device further comprises a touch unit 7, as shown in FIG. 4. The touch unit 7 comprises a detection module 71, a judgment module 72 and a touch module 73. The touch unit 7 further stores therein a corresponding table in which a plurality of movement actions of the object to be detected is correspondingly associated with a plurality of touch functions. The detection module 71 is used for detecting the movement action of the object to be detected relative to the audio device 5 after the surface feature information of the object to be detected passes the authentication of the touch authentication unit 6 (the matching result shows conformity). The judgment module 72 is used for judging which touch function corresponds to the movement action of the object to be detected according to the detection result from the detection module 71. The touch module 73 is used for activating the touch function corresponding to the movement action according to judgment result from the judgment module 72.

Specifically, the detection module 71 is capable of detecting the movement action of the object to be detected by detecting the relative displacement of the object to be detected relative to the audio device 5. In an example, the touch unit 7 can achieve some simple touch functions for the display device. For example, when a user is playing games, the detection module 71 detects the displacements of the object to be detected in the directions of up, down, left and right, so as to determine the movement action of the object to be detected. The judgment module 72 judges which touch function the movement action of the object to be detected corresponds to according to the movement action (such as instructing a figure in the game to move towards a certain direction). The touch module 73 activates the corresponding touch function according to judgment result (such as making the figure in the game move towards a certain direction).

With the audio device according to the embodiment of the present invention included therein, the display device provided in the embodiment of the present invention can not only collect and authenticate the surface feature information of the object to be detected, but also allow the object to be detected which passes authentication to perform touch operation on the display device. Meanwhile, since the audio device according to the embodiment of the present invention is adopted, the space of the display device is saved and the cost of the display device is also reduced It should be understood that the above embodiments are only exemplary embodiments for illustrating the principle of the present invention, but the present invention is not limited thereto. Various variations and improvements can be made by a person of ordinary skill in the art without departing from the spirit and essence of the present invention, and these variations and improvements should also be considered to fall within the protection scope of the present invention.

The invention claimed is:

1. An audio device, comprising a vibrating diaphragm used for converting an acoustical signal into an electrical signal or converting an electrical signal into an acoustical signal, wherein the audio device further comprises an ultrasonic emitting element and a processing circuit,
   the ultrasonic emitting element is used for emitting an ultrasonic signal;
   the vibrating diaphragm is also used for receiving a reflected wave signal of the ultrasonic signal reflected from a surface of an object to be detected, converting the reflected wave signal into an electrical signal, and sending the converted electrical signal to the processing circuit; and
   the processing circuit is used for processing the converted electrical signal so as to obtain surface feature information of the object to be detected, the surface feature information being used for identifying the object to be detected.

2. The audio device according to claim 1, wherein,
   the vibrating diaphragm is arranged between the ultrasonic emitting element and the object to be detected, and a position of the vibrating diaphragm corresponds to that of the ultrasonic emitting element.

3. The audio device according to claim 2, wherein,
   the vibrating diaphragm comprises a base and a receiving element arranged on the base, and
   the receiving element is used for receiving the reflected wave signal reflected from the surface of the object to be detected, converting the reflected wave signal into the electrical signal, and sending the converted electrical signal to the processing circuit.

4. The audio device according to claim 3, wherein,
   the receiving element comprises a first film layer and a second film layer sequentially stacked on the base,
   the second film layer is used for receiving the reflected wave signal reflected from the surface of the object to be detected and converting the reflected wave signal into the electrical signal, and
   the first film layer is used for sending the converted electrical signal to the processing circuit.

5. The audio device according to claim 4, wherein, the first film layer is formed of a metal conductive material, and the second film layer is formed of an organic piezoelectric material.

6. The audio device according to claim 3, further comprising a magnetic element arranged under the vibrating diaphragm and opposite to the base, wherein,
   the base vibrates, under the effect of a magnetic field generated by the magnetic element, to convert an electrical signal into an acoustical signal, or vibrates, under the effect of an acoustical signal, and cuts the magnetic field generated by the magnetic element to convert the acoustical signal into an electrical signal.

7. The audio device according to claim 6, wherein, the base is a silicon slice.

8. The audio device according to claim 3, wherein, the vibrating diaphragm comprises a plurality of receiving elements arranged at intervals.

9. The audio device according to claim 8, wherein, the plurality of receiving elements are distributed uniformly.

10. The audio device according to claim 9, wherein, the plurality of receiving elements are arranged in a matrix.

11. The audio device according to claim 10, wherein,
    a distance between any two adjacent receiving elements is within a range of 50-100 μm; and
    each of the receiving elements is in a rectangle shape with a side length within a range of 50-200 μm.

12. The audio device according to claim 11, wherein, a resolution of the receiving elements is 500 dpi or more.

13. The audio device according to claim 1, wherein a distance between the vibrating diaphragm and the object to be detected is 10 cm or less.

14. The audio device according to claim 1, wherein, the processing circuit comprises an image generating circuit, an image processing circuit and a feature information extracting circuit;
    the image generating circuit is used for generating an image of the surface of the object to be detected according to the converted electrical signal and sending the image of the surface of the object to be detected to the image processing circuit;
    the image processing circuit is used for performing a detailed operation processing on the image of the surface of the object to be detected and sending the processed image of the surface of the object to be detected to the feature information extracting circuit; and
    the feature information extracting circuit is used for extracting the surface feature information of the object to be detected from the processed image of the surface of the object to be detected.

15. The audio device according to claim 1, wherein, the object to be detected comprises a finger, and the surface feature information of the finger comprises feature information of a fingerprint.

16. A display device, comprising the audio device according to claim 1.

17. The display device according to claim 16, further comprising a touch authentication circuit, which comprises a surface feature information database and a matching circuit, wherein,
    the surface feature information database is used for storing the surface feature information of a plurality of objects to be detected; and
    the matching circuit is used for matching the surface feature information obtained by the processing circuit with the surface feature information stored in the surface feature information database, and if the matching result shows that the obtained surface feature information is in conformity with the stored surface feature information, it is allowed to perform touch operation on the display device.

18. The display device according to claim 17, further comprising a touch circuit, which comprises a detection circuit, a judgment circuit and a touch subcircuit, wherein, the touch circuit stores therein a corresponding table in which a plurality of movement actions of the object to be detected are correspondingly associated with a plurality of touch functions;

the detection circuit is used for detecting the movement action of the object to be detected relative to the audio device when the matching result shows that the obtained surface feature information is in conformity with the stored surface feature information;

the judgment circuit is used for judging which touch function the movement action of the object to be detected corresponds to according to detection result from the detection circuit; and the touch circuit is used for activating the touch function corresponding to the movement action of the object to be detected according to judgment result from the judgment circuit.

19. The display device according to claim 16, wherein, the audio device is a microphone or a loudspeaker of the display device.

20. The display device according to claim 16, wherein, the vibrating diaphragm is arranged between the ultrasonic emitting element and the object to be detected, and a position of the vibrating diaphragm corresponds to that of the ultrasonic emitting element.

* * * * *